Figure 3:
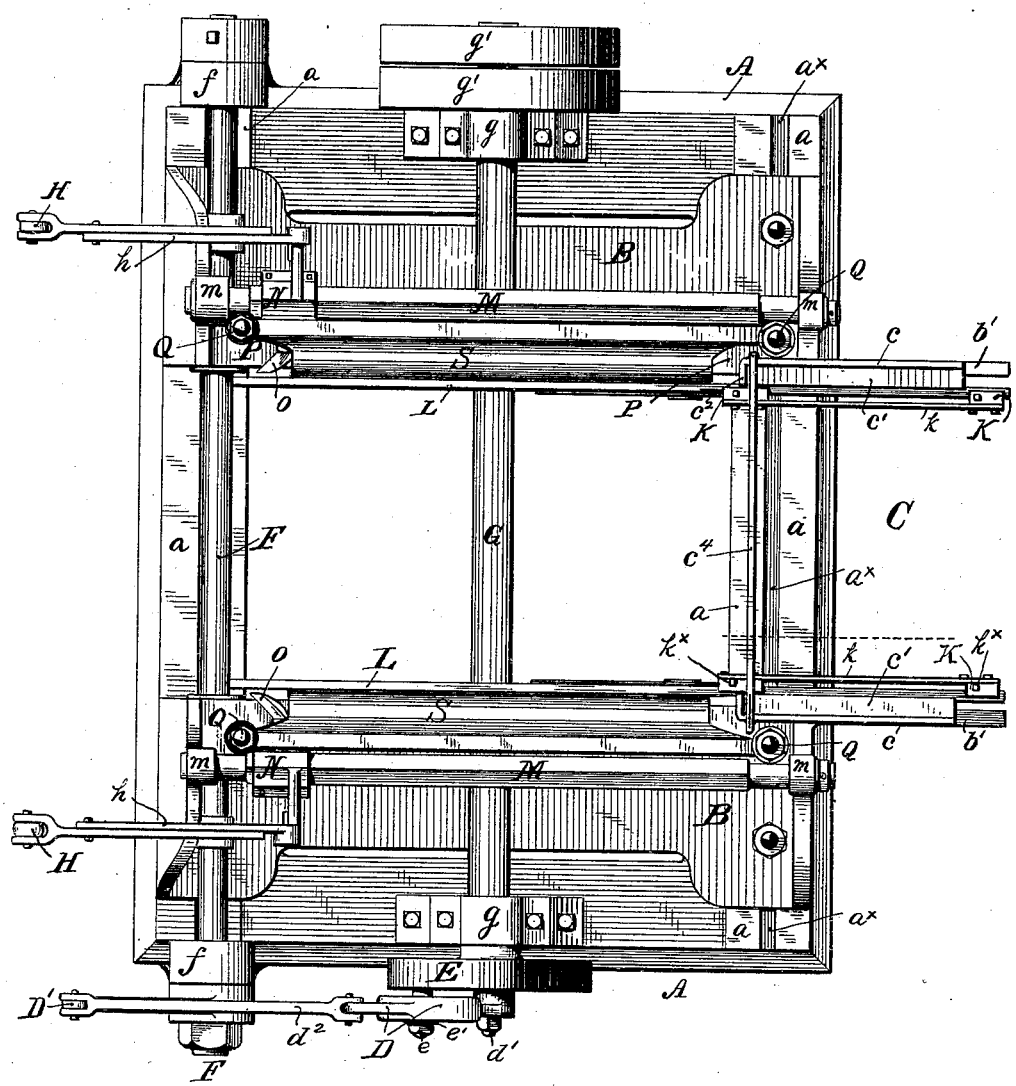

(No Model.)  6 Sheets—Sheet 1.
A. H. POSTEL.
MACHINE FOR BEVELING THE EDGES OF CARDS AND CARD BOARD.
No. 343,337. Patented June 8, 1886.
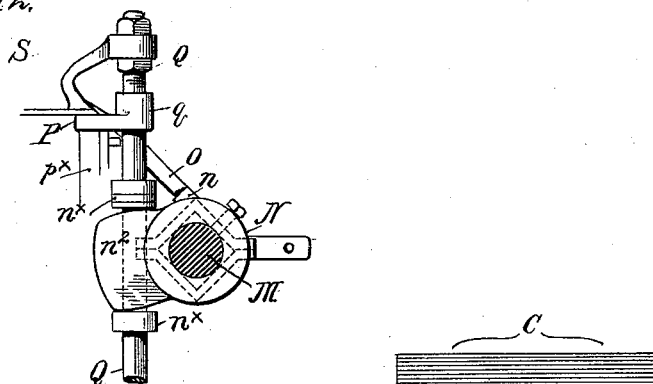
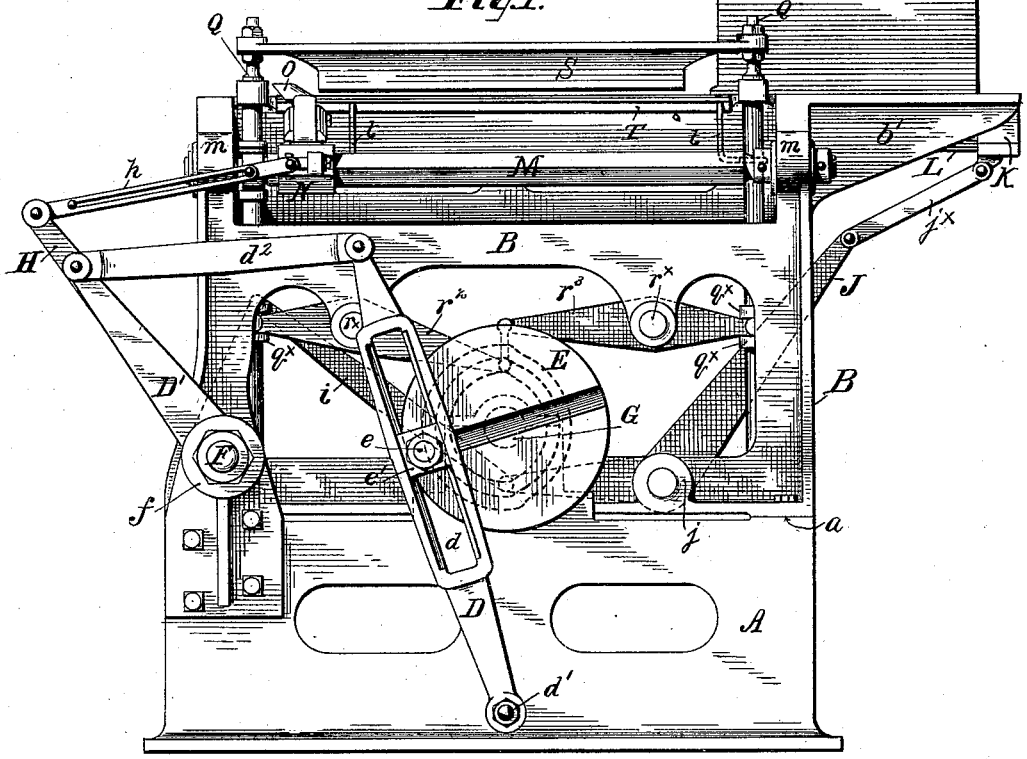

(No Model.) 6 Sheets—Sheet 2.
A. H. POSTEL.
MACHINE FOR BEVELING THE EDGES OF CARDS AND CARD BOARD.
No. 343,337. Patented June 8, 1886.
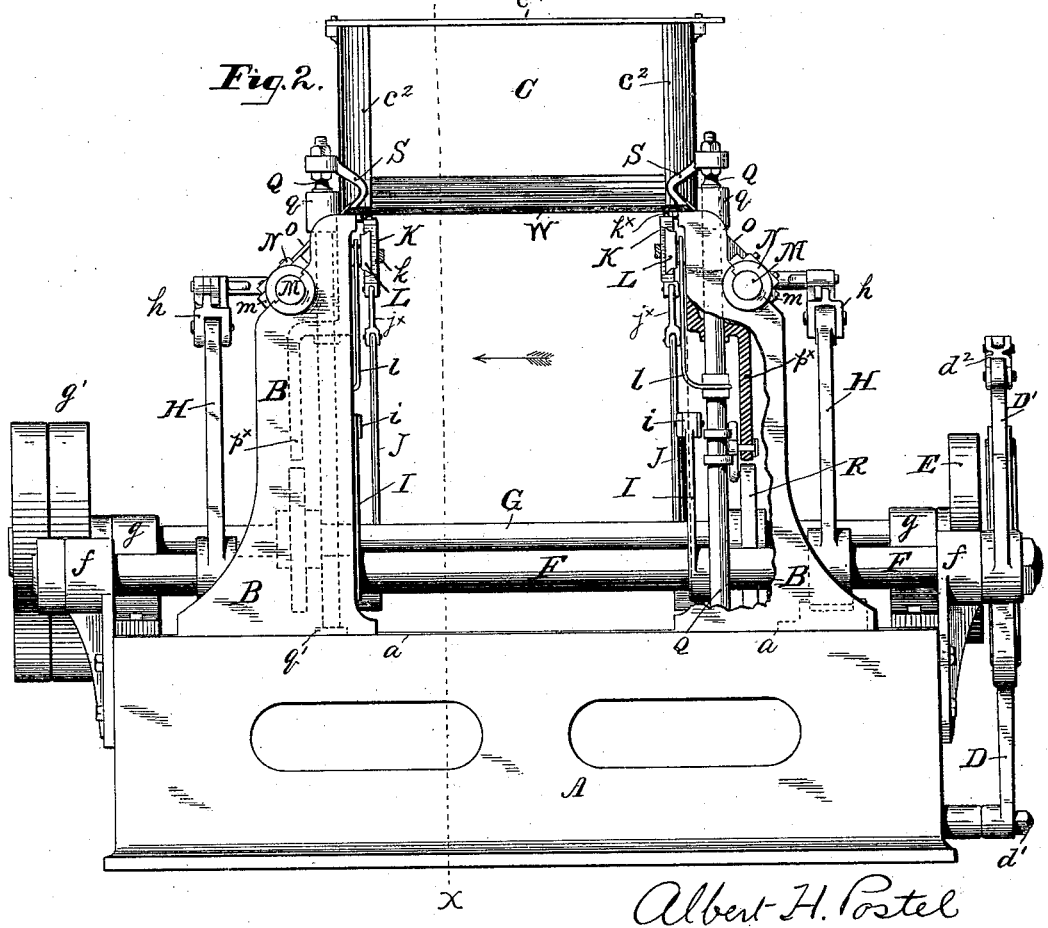
WITNESSES:
Albert H. Postel
INVENTOR
By his Attorneys,
Wm. C. Strawbridge
J. Bonsall Taylor (No Model.) 6 Sheets—Sheet 3.

A. H. POSTEL.

MACHINE FOR BEVELING THE EDGES OF CARDS AND CARD BOARD.

No. 343,337. Patented June 8, 1886.

(No Model.) 6 Sheets—Sheet 4.
A. H. POSTEL.
MACHINE FOR BEVELING THE EDGES OF CARDS AND CARD BOARD.
No. 343,337. Patented June 8, 1886.
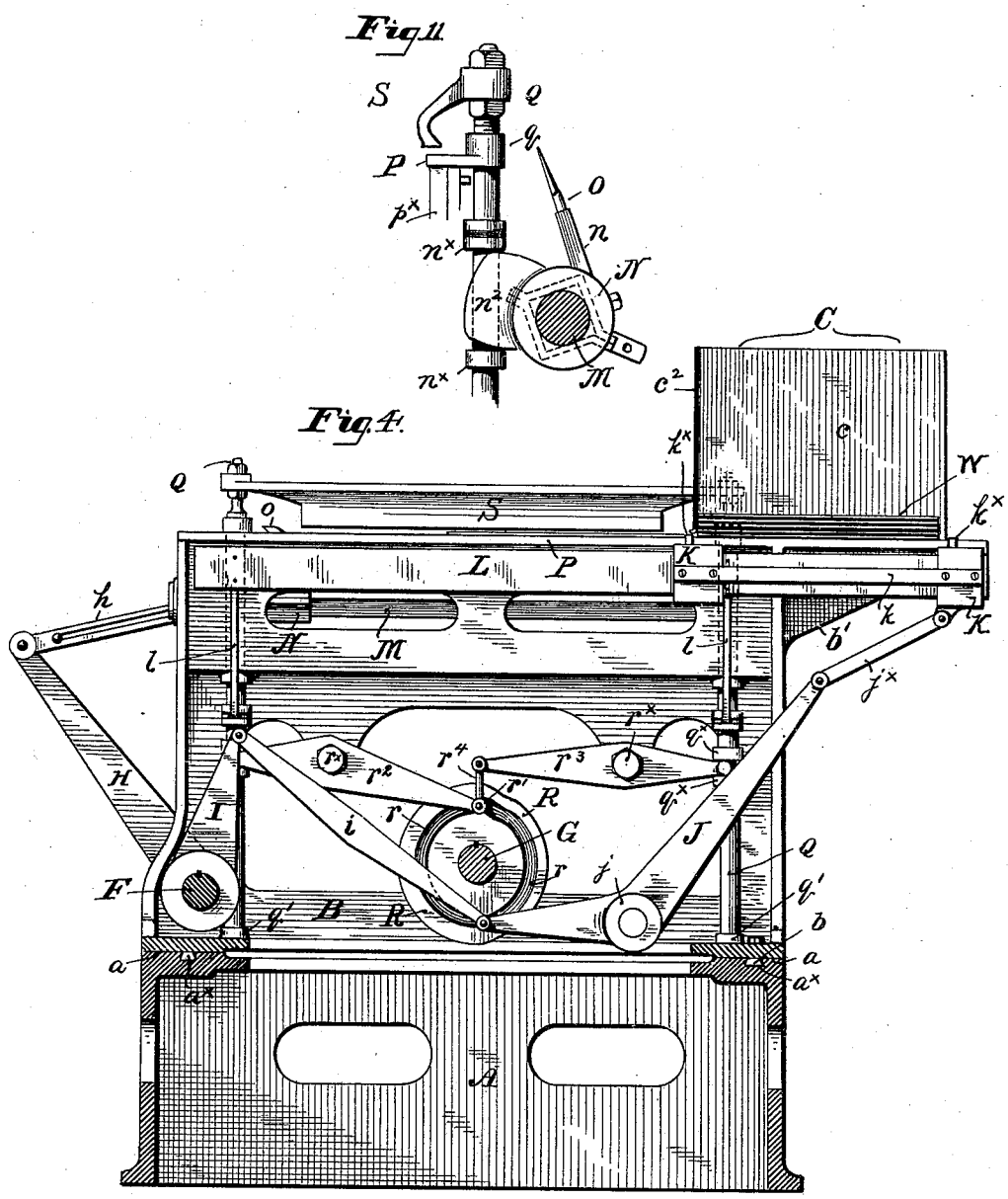

(No Model.) 6 Sheets—Sheet 5.
A. H. POSTEL.
MACHINE FOR BEVELING THE EDGES OF CARDS AND CARD BOARD.
No. 343,337. Patented June 8, 1886.
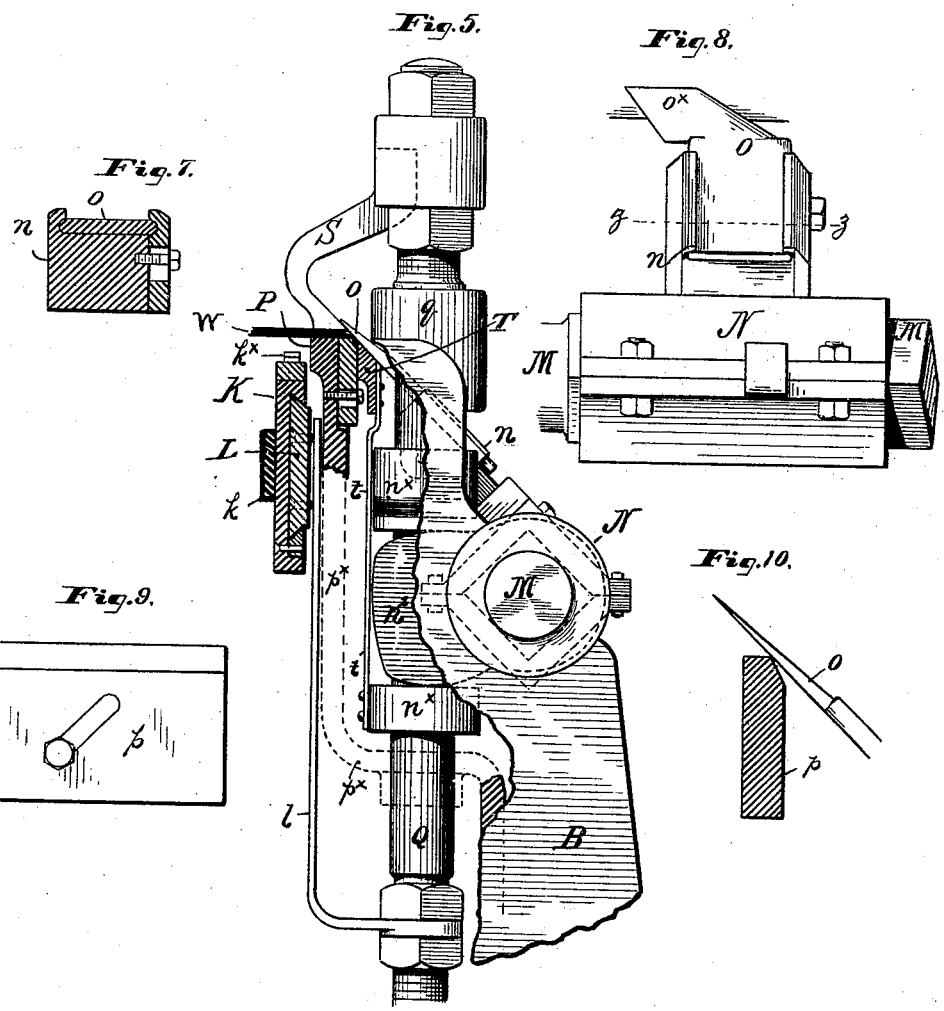
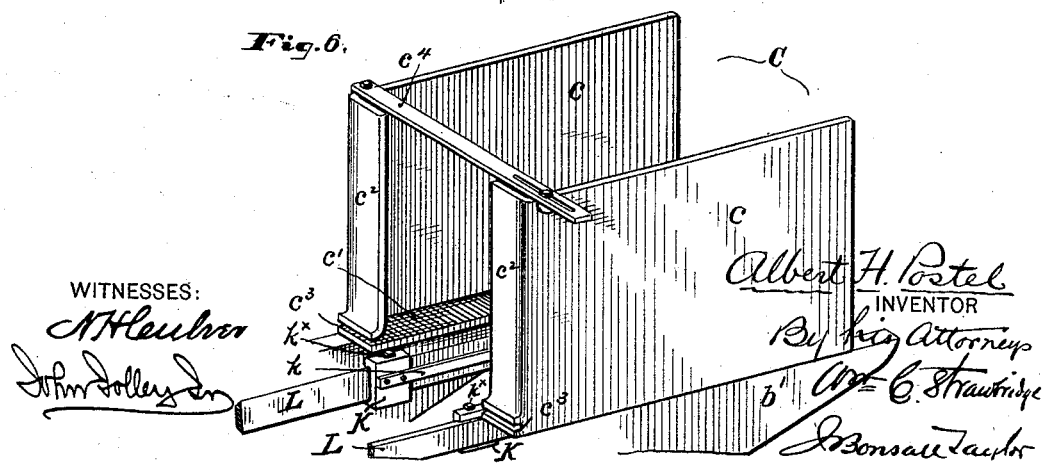

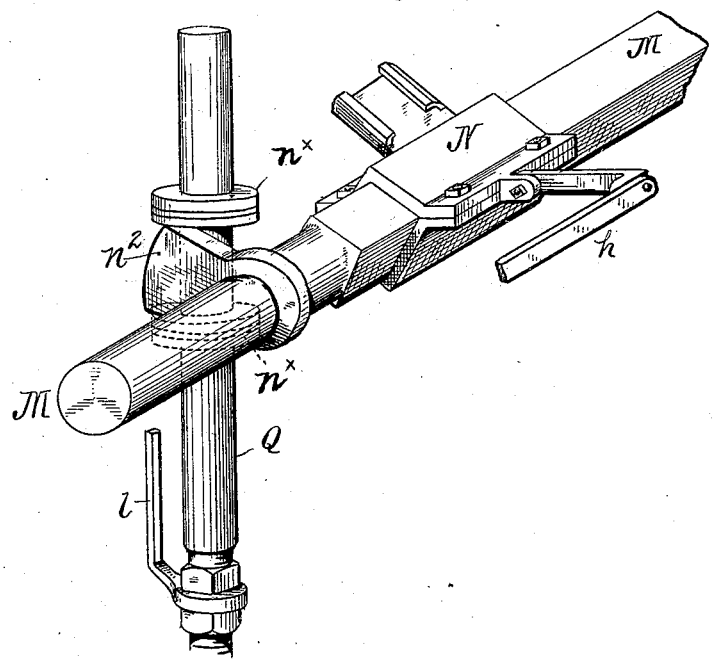

UNITED STATES PATENT OFFICE.

ALBERT H. POSTEL, OF PHILADELPHIA, PENNSYLVANIA.

MACHINE FOR BEVELING THE EDGES OF CARDS AND CARD-BOARD.

SPECIFICATION forming part of Letters Patent No. 343,337, dated June 8, 1886.

Application filed March 23, 1885. Serial No. 159,742. (No model.)

*To all whom it may concern:*

Be it known that I, ALBERT H. POSTEL, a citizen of the United States, residing in the city and county of Philadelphia, and State of Pennsylvania, have invented a new and useful Machine for Beveling the Edges of Cards and Card-Boards, of which the following is a specification.

The object of my invention is the construction of a compact, simple, and accurately-operating machine for simultaneously beveling, to any predetermined angle, two parallel sides of a card or strip of thick paper, pasteboard, bristol-board, or kindred material of any desired width.

Apparatus embodying my invention is represented in the accompanying drawings and described in this specification, the particular subject-matter claimed as novel being hereinafter definitely specified.

In the drawings, Figure 1 is a side elevation of my entire apparatus. Fig. 2 is a left-hand end view of the same, looking toward the feeding end. Fig. 3 is a top plan view of the same. Fig. 4 is a central vertical sectional side elevation. In all of the foregoing figures the parts are represented in the position which they occupy when the machine is in readiness for the feeding of a card. Fig. 5 is a fragmentary partially-sectional and partly-elevational left-hand end view of one of the lifting-rods, particularly illustrating one of the cardways, one of the vertically-movable sides thereof, one of the sliders and slider-rails, one of the clamps, one of the cutter-shafts, and one of the knives or cutters, and the said parts being in the positions which they relatively occupy when the card has been fed and clamped, and when the cutter is in readiness to operate. Fig. 6 is a perspective view of the hopper, representing also the slider-rails and the connected sliders. Fig. 7 is a cross-sectional detail of one of the knife-holders and knives, section being supposed in the plane of the dotted line $z\ z$ of Fig. 8. Fig. 8 is a side elevational view of the knife represented in Fig. 5, and of its boxing. Fig. 9 is a side elevation of one of the longitudinal bearing-plates which are applied to the cardways. Fig. 10 is a cross-sectional view of said bearing-plate, representing the angle at which the knife, when in readiness for cutting, rests thereupon. Fig. 11 is a fragmentary view, similar to Fig. 5, representing, however, the lifting-rod in its elevated position, the clamp which it carries raised from the cardway, and the cutter-shaft rotated so as to throw the knife away from the cardway. Fig. 12 is a view similar to Fig. 11, representing the same parts in their opposite positions. Fig. 13 is a fragmentary partly-elevational and partly-sectional detail representing a tongue and groove, by means of which a side frame is adapted to have a movement upon the bed-frame. Fig. 14 is a fragmentary perspective detail illustrative of the application of one of the lugs $n^2$ to one of the cutter-shafts M, one of the cutter-boxings and lifting-rods being likewise shown.

Similar letters of reference indicate corresponding parts.

The frame-work of my machine is conveniently composed of a walled or hollow bed-frame, A, transversely across the top surface, and near to the end walls of which are formed housing-ways $a$, upon the upper surface of each of which is formed a groove, $a^\times$, for guiding the side frames or housings in a movement toward or from each other.

B are two parallel side frames or housings, erected from the said bed-frame upon the housing-ways $a$ thereof, and adapted by means of the tongues $b$, with which they are provided to travel with respect to the grooves $a^\times$ in said housing-ways. The two side frames, although reversed in position, are alike in construction, and are provided with and support similar component elements or members of the machine. The side frames are adapted to be moved closer together or wider apart upon the bed-frame, in order to fit the machine to simultaneously bevel opposite parallel sides of cards of varying width. Each of the side frames, by means of brackets $b'$, supports the vertical side plates, $c$, of a hopper, C, for containing the cards to be beveled, and as the side frames are moved together or separated, so likewise are the side plates of the hopper. Each side plate $c$ of the hopper is, as shown in Fig. 6, provided with a horizontal card-ledge, $c'$, upon which two ledges the stack of cards in the hopper rests, and also provided with a vertical inturned front flange, $c^2$, between which and the card-ledge $c'$ is a horizontal feed-slot, $c^3$. By making the front flanges of the hopper vertically adjustable, as is readily done, the feed-slots $c^3$ can be made of precisely the vertical breadth of the thickness of a given card. The side plates of the hopper are adapted, when set in a given position, to be held together at the top by means of the cross-tie $c^4$. The hopper is disposed at the front or feeding end of the machine.

G is the driving-shaft of the machine, transversely and horizontally disposed in bearings $g$, mounted upon the bed-frame A. The driving-shaft at one of its extremities is equipped with the usual fast and loose or cone pulleys, $g'$, and at its other extremity is provided with a crank-disk, E, equipped with an adjustable wrist-pin, $e$, carrying a boxing, $e'$, which is entered within and travels in a slotted way, $d$, formed in what I call a "major rocker," D, which is pivoted at $d'$, at its lower extremity, to the bed-frame, and at its upper extremity is connected, by means of a link, $d^2$, with the upper extremity of what I term a "minor rocker," D', rigidly mounted upon one extremity of a horizontal rock-shaft, F, transversely disposed in parallelism with the driving-shaft in bearings $f$, connected with the bed-frame. The pulleys and the crank-disk are fixedly connected with the driving-shaft G, as is also the minor rocker D' with the rock-shaft F. It is obvious, therefore, that when rotation is through the pulleys imparted to the driving-shaft the revolution of the crank-disk will occasion the vibration of the major rocker, and that the vibration of the latter through the link $d^2$ will occasion the vibration of the minor rocker and the oscillation of the rock-shaft. The oscillatory movement imparted to the rock-shaft is utilized, as hereinafter described, through two rocker arms, H, feathered thereon to impart movement to the two cutters, and through two auxiliary rockers, I, likewise feathered thereon to impart movement to the card-feed in the following manner: Each of these auxiliary rockers I is as to its upper extremity connected, by means of a rocker-link, $i$, to the lower arm of a bell-crank lever, J, of which there are two, which respectively have their fulcra in bearings $j$, formed in the bases of the respective side frames of the machine, and the upper arms of which are connected by lever-links $j^\times$ with the sliders K, which are mounted upon the slider-rails L conveniently by such a miter-groove connection as is represented in Fig. 5, are respectively connected together by the connecting-bars $k$, and are equipped with the upwardly-projecting feed-studs $k^\times$. The two slider-rails are supported by the carrying-rods $l$ from the lifting-rods, whereof hereinafter, and respectively extend into the open space between the side frames and the card-ledges of the side plates of the hopper. Assuming that the slider-rails L are fixed, it is obvious that the oscillatory movement imparted to the rock-shaft F will, through the auxiliary rockers I, rocker-links $i$, bell-crank levers J, and lever-links $j^\times$, occasion the longitudinal reciprocation of the connected sliders K upon the said slider-rails. The longitudinal distance apart of each pair of feed-studs is slightly in excess of the length of the hopper, so that when the sliders are in the position represented in Fig. 4 the two rear studs of each set are to the rear of the hopper and in position upon their advance to push the undermost card from the pile in the hopper from out the hopper, and the two front studs of each set are just to the front of the hopper and in position upon the said advance of the connected sliders to push a card which happens to be ahead of them on the cardways from right to left of the side frames of the machine, and so discharge it.

The means for cutting or beveling the edges of the card are the following: In suitable boxings, $m$, connected, respectively, with the side frames, are housed two shafts, which I call "cutter" shafts, M, and which are horizontal and parallel with each other and with the respective side frames to which they are applied. Each of these shafts is of square or polygonal section, except as to the journal portion thereof, or that portion which is entered in the shaft-bearings $m$, the latter portion being circular in section, so that the shafts as an entirety are adapted to have a slight oscillatory movement with respect to their bearings. Upon each of the said shafts is mounted a cutter-boxing, N, each of which is internally conformed to the squared portion of the shaft, and is adapted to be reciprocated upon and end for end of said shaft. To the outside of each of these boxings is pivotally secured an extensible connecting-bar, $h$, which are respectively pivotally secured to the upper extremities of the two rocker-arms H. It is obvious, therefore, that when the rock-shaft is oscillated, as already described, the throw of its rocker-arms is, through the medium of the said extensible connecting-bars, transmitted to the said cutter-boxings, which are thereby reciprocated upon the shafts.

The connection of the connecting-bars with the cutter-boxes is, as stated, upon the outside of the said boxes. Internally or to the inside, each of the said cutter-boxings is provided with a fixed knife-holder, $n$, which is a housing of any preferred form, within which is secured the cutter or knife O, which is preferably of the shape represented in Fig. 8, and provided with the cutting-edge $o^\times$, which is oblique, and in the set of the knives faces away from the feeding end and toward the delivery end of the machine, the cutting of the knives taking place from right to left as the rocker-arms take on their backward throw. Each of the said frames is so formed as to be provided with a fixed longitudinal cardway, P, conveniently supported upon the curved bracket-plate $p^\times$, the said ways being respectively parallel and forming the table, so to speak, or surface upon which the cards are deposited after they are fed from out the hopper. Each of these cardways is equipped with an adjustable longitudinal bevel-edged bearing-plate, $p$, Figs. 9, 10, and 5, against which the knife rests and travels in its cutting throw. These cardways, being fixtures of the side frames, are of an invariable height corresponding with the level of the card-ledges $c'$ of the hopper, and are the surface upon which the cards are one by one fed. It will now be obvious that if the sliders which carry the feed-studs are to be effectively operated for the feeding of the cards one by one from the hopper, and for the advance of the cards along the cardways, the said sliders must in addition to this end for end travel have imparted to them an up-and-down movement, as otherwise the retreat of the said sliders would occasion the driving back of the card into the hopper after it had been advanced from out of it. This up-and-down movement is provided for by mounting the slider-rails L L, which, as stated, project into the open space between the side frames and the side plates of the hopper, and upon which the sliders travel, respectively, by means of the carrying-rods $l$, upon two lifting rods, Q, which are respectively housed in upper slide-bearings, $q$, and lower slide-bearings, $q'$, connected with the respective side frames, and to which lifting-rods a predetermined up-and-down movement is by suitable means and at predetermined intervals imparted.

The means which I adopt for raising and lowering the lifting rods are the following: Upon the driving-shaft G are feathered two cam-disks, R, which contain in their sides camway-grooves $r$ of suitable course. To each of the side frames I pivot at the points $r^x$, two levers of the first order, which I term "rocker-levers," and respectively designated $r^2 r^3$, the said levers at their inner ends being connected together by the link-pins $r^4$ and at their outer extremity bearing between collars $q^x q^x$, fixed upon the said lifting-rods, so that the throw of said levers is communicated to the said lifting-rods to raise or lower them. In connection with either the levers $r^2$ or the link-pins $r^4$, I provide rollers $r'$, which travel in the camway-grooves $r$ in the respective cam-disks, so that upon the rotation of the said cam-disks with the driving-shaft an up-and-down motion is communicated to the said rollers by the varying course of the said camway-grooves. By such means a uniform vibration is imparted to the said rocking levers and a uniform up-and-down movement through said levers to the lifting-rods. The two lifting-rods of each side frame are connected together at the top by a longitudinally-extending clamp S, Figs. 1, 2, 3, 4, 5, 11, and 12, and the said clamps are of such curvature that their under or clamping surfaces are parallel with and immediately above the cardways P. When the lifting-rods are lifted, the clamps are lifted, as shown in Figs. 1, 2, 4, and 11, and when the lifting-rods are dropped the clamps are dropped and brought down upon the card, as shown in Figs. 5 and 12. The timing of the movement of the cam-disks is such that the lifting-rods and their clamps are elevated immediately before the forward travel or advance of the connected sliders, and depressed as soon as the said sliders have advanced and fed a card beneath the clamps. At the same time with the lifting of the clamps, the slider-rails are by the said lifting-rods together elevated to an extent sufficient to bring the feed-studs of the connected sliders above the level of the card-ledges and cardways and in range to encounter either the undermost card in the hopper, or the said undermost card and a card which has been previously fed from the hopper, and which is then upon the cardways. The lifting of the lifting-rods is therefore timed to take place when the connected sliders are in the position represented in Figs. 1, 3, and 4, or before they have advanced, and the lifting-rods are retained in their elevated position long enough to allow the connected sliders to have completed their forward travel or advance, after which advance, in the timing of the movement of the machine, the lifting-rods descend and carry down with them the slider-rails, so that the return of the connected sliders takes place while the rails are sufficiently below the carrying-level of the card ledges and ways to insure that the feed-studs do not project above said level. The retreat of the connected sliders takes place while the clamps are down upon the card which has been last fed out of the hopper, and at the same time that the knives and cutter-boxings, as hereinafter explained, are caused to make their cutting advance. As the cardways must be made without permanent sides, in order to permit of the drop or tilting in of the knives against them for the beveling of the cards, it is obvious that a card fed out from the hopper is liable to be incorrectly or crookedly disposed upon said ways and clamped in such crooked position. I therefore provide two preferably bevel-edged movable sides or side plates, T, which I connect by means of the supports $t$ with the lifting-rods, and which, as the lifting-rods ascend, rise on each side and closely against the bearing-plates $p$ or outside surfaces of the cardways, and in so rising form temporary sides to the ways. These side plates remain up during the time when the clamps are up and when the card is being fed from out the hopper, and they serve to direct its rectilinear position upon the cardways, so that when the time comes for the clamps to descend and the said side plates to also drop below the level of the cardways, the card shall be in position to be clamped and beveled.

Referring now to the knives and their action, it is obvious that during the time when the movable side plates of the cardways are elevated it would be impossible for a fixed knife that was set to travel against the bearing-plate $p$ or outside surface or edge of the cardways to travel, for the reason that the said side plates would block their movement. As, however, in the organization of my machine, it is necessary for the cutter-boxings and their knives to have imparted to them their rearward travel at the time when the movable side plates are elevated, it is obvious that provision must be made for rocking, tilting, angling, or throwing the knives during their backward movement out of range with the cardways. This I accomplish by rocking the cutter-shafts, upon which, as stated, the cutter-boxings of the knives are mounted. The means adopted for so doing are the application of a lug, $n^z$, Figs. 5, 11, 12, and 14, to the cylindriform portion of each cutter-shaft M, which lug is engaged between two fixed collars, $n^x n^z$, preferably faced with hard rubber and secured upon the lifting-rods. As the lifting-rods rise, they by their collars $n^x$ lift the lugs and tilt the cutter-shafts, and with them tilt the boxings and the knives which the latter carry, after the manner shown in Fig. 11, such operation taking place just before the time when the cutter-boxings are caused to take on their rearward movement or to travel from left to right and when the card is being fed, and as the rods fall they similarly carry down with them the lugs and retilt the boxings, knives, and shafts until the knives lie against the longitudinal bearing-plates of the cardways, as shown in Fig. 12, and are in position to cut, this action taking place at the time when the cutter-boxings are at the right end of the cutter-shafts and in position to be retracted by the rearward throw of the rocker-arms from right to left along said shafts, so as to occasion the operation of their knives for the beveling of the cards.

W are the cards to be beveled.

Having now described the construction of an apparatus conveniently embodying my invention, it is believed that the operation of the same has also been sufficiently described. It is believed proper, however, to repeat that the right-handed oscillatory throw of the rock-shaft F, or that which occasions the advance of the rocker-arms H and the travel of the knives from the left to the right, or from the position which they occupy after they have finished cutting to that which they assume when they are about to begin cutting, and which also occasions the right-handed throw of the auxiliary rockers I, and the consequent advance from right to left of the connected sliders or card-feed, takes place at a time when the knives are tilted out and when lifting-rods are elevated, and the clamps, slider-rails for the connected sliders, and movable sides for the cardways are likewise elevated, and also to repeat that the left-handed oscillatory movement of said rock-shaft F, which occasions the left handed or advance travel of the knives and their beveling of the card and the retreat of the connected sliders or feed device takes place while the lifting-rods are down, the knives tilted in, the clamps upon the card, the movable side plates below the level of the cardways, and the slider-rails and their connected sliders also down. As already explained, when the lifting-rods are up the knives are deflected out of contact with the cardways, and when the lifting-rods are down the knives are deflected into contact with the cardways and into position to cut.

I have explained that the side frames can be moved together or apart upon the bed-frame. Now, each of these side frames carries or is provided with a clamp, two lifting-rods, a cardway, a movable side therefor, a side plate and one card-ledge of the hopper, a slider-rail, a pair of sliders, a bell-crank lever, two rocking levers, and a cutter-shaft, boxing, and knife. In addition, moreover, to the foregoing elements, which are connected with or carried by the said side frames, it is necessary, when the side frames are to be adjusted for cards of a different width, to move upon the rock-shaft the rocker-arms H and the auxiliary rockers I, and to move upon the driving-shaft the cam-disks R. This adjustment, however, is provided for by having the said several devices feathered upon the said shafts, as already explained, and adapted to be secured in given positions by suitable fastening devices.

The successive movements which the different moving parts have imparted to them are regulated and timed by the adjustment of the wrist-pin of the crank-disk, the adjustment of the extensible connecting-bars $h$, the proportions of the camway-grooves of the cams, and the set of the various connected parts with respect to the lifting-rods, the operation as an entirety taking place after the manner already explained.

There are many details of mechanical construction which can be modified without departing from my invention. Thus the rocking levers and the cams are simply a convenient means for securing a predetermined lift and drop of the lifting-rods, and a predetermined retention of the said rods in their upper and lower positions. Other mechanisms might be substituted to perform the same results. Thus, also, the auxiliary rockers, the rocker-links, the bell-crank levers, and the lever-links are simply a convenient means for occasioning the reciprocation of the sliders which carry the feed-studs. The major rocker, the minor rocker, and their connecting-link are, moreover, simply a convenient means for transmitting the revolution of the wrist-pin of the crank-disk to the rock-shaft. Thus, also, the lifting-rods are simply a convenient means for occasioning the support and movement of the clamps, the movable sides of the cardways and the slider-rails, and any mechanic can obviously make many changes in those connecting, supporting, and motion-giving instrumentalities. The gist of my invention, however, resides in the combination, in an organized whole, of means for feeding one card at a time upon a supporting-surface, means for holding a card down upon said surface, and means for simultaneously beveling two of its parallel sides while it is so held down.

I believe that the devices which I have shown and described conveniently, cheaply, and effectually carry into practice the above operation.

Having thus described my invention, I claim and desire to secure by Letters Patent—

1. In a card-beveling machine, in combination with cardways, upon which a card is fed, cutters respectively mounted upon the outside of the respective cardways, means, essentially such as described, for moving the said cutters in against the cardways, and for causing them to travel lengthwise of said ways when in such position, and means, essentially such as described, for moving the said cutters away from the ways, and for causing them to travel lengthwise of said ways when in such position, substantially as described, and for the purpose specified.

2. In a card-beveling machine, in combination with cardways, upon which a card is fed, two knives respectively mounted upon the outside of the respective cardways, means, essentially such as described, for simultaneously inclining the said knives against the cardways, and for causing them to travel lengthwise of said ways when in such position, means, essentially such as described, for moving the said knives away from the ways, and for causing them to travel lengthwise of said ways when in such position, and clamps for holding down the card upon said ways while the knives are acting upon it, substantially as described, and for the purpose specified.

3. In a machine for beveling card-board, the following elements in combination: a hopper, means, essentially such as described, for feeding a card from said hopper upon cardways, cardways, upon which a card is fed, two knives respectively mounted upon the outside of the respective cardways, means, essentially such as described, for simultaneously inclining the said knives against the cardways, and for causing them to travel lengthwise of said ways when in such inclined position, means, essentially such as described, for moving the said knives away from the ways, and for causing them to travel lengthwise of said ways when in such position, substantially as described, and for the purpose specified.

4. In a machine for beveling card-board, the following elements in combination: a hopper, means, essentially such as described, for feeding a card from said hopper upon cardways, cardways upon which a card is fed, two knives respectively mounted upon the outside of the respective cardways, means, essentially such as described, for simultaneously inclining the said knives against the cardways, and for causing them to travel lengthwise of said ways when in such position, means, essentially such as described, for moving the said knives away from the ways, and for causing them to travel lengthwise of said ways when in such position, and clamps for holding down the card upon said ways while the knives are acting upon it, substantially as described, and for the purpose specified.

5. In a machine for beveling card-board, the following elements in combination: a hopper or receptacle for cards, ways upon which the cards are adapted to be fed and to travel, a feed device for advancing the cards one by one from the hopper, clamping devices for holding down a card which has been fed upon the ways, cutting mechanism for beveling two parallel edges of a clamped card, means, essentially such as described, for operating the feeding device, means, essentially such as described, for operating the clamping device, and means, essentially such as described, for operating the cutting mechanism, substantially as shown and described, and for the purposes specified.

6. In a machine for beveling card-board, the following elements in combination: ways upon which a card is fed, clamps for holding the card down upon the ways, pivoted knives supported upon the outside of the respective ways, means, essentially such as described, for both tilting the knives upon their pivots away from the ways, and for causing them to move in against the ways, and means, essentially such as described, for occasioning the longitudinal reciprocation of the knives with respect to the ways, substantially as shown and described, and for the purpose specified.

7. In a machine for beveling card-board, the following elements in combination: a hopper, cardways, clamps for holding a card down upon the ways, a card-feed device, means, essentially such as described, for imparting to said card-feed device both a longitudinally-reciprocating and an up-and-down movement, knives, means, essentially such as described, for imparting to said knives a longitudinally-reciprocating movement, means, essentially such as described, for imparting to said knives a tilting or in-and-out movement with respect to the cardways, and means, essentially such as described, for raising and lowering the clamps, substantially as shown and described, and for the purposes set forth.

8. In a machine for beveling card-board, the following elements in combination: a hopper, cardways, movable sides for said ways, means, essentially such as described, for moving said sides up and down with respect to the ways, clamps for holding the cards down upon the ways, a card-feed device, means, essentially such as described, for imparting to said card-feed device both longitudinally-reciprocating and an up-and down movement, knives, means, essentially such as described, for imparting to said knives both a longitudinally-reciprocating and an in-and-out movement with respect to the cardways, and means, essentially such as described, for raising and lowering the clamps, substantially as shown and described, and for the purpose specified.

9. In a machine for beveling card-board, the following elements in combination: a hopper, cardways, a feeding device, knives, clamps, means, essentially such as described, for simultaneously lifting the feeding device and the clamps, and for simultaneously dropping the same, means, essentially such as described, for moving the knives into action after the clamps have descended, means, essentially such as described, for drawing the knives against the card when moved into action, means, essentially such as described, for occasioning the retreat of the feeding device when the clamps have descended, means, essentially such as described, for occasioning the advance of the feeding device when the clamps have risen, means, essentially such as described, for throwing the knives out of action after the clamps have risen and for returning the knives into position to act upon another card, substantially as shown and described, and for the purposes set forth.

10. In a machine for beveling card-board, the following elements in combination: a hopper, cardways, a feeding device, knives, clamps, means, essentially such as described, for simultaneously lifting the feeding device and the clamps, and for simultaneously dropping the same, movable sides for the cardways, means, esssentially such as described, for lifting the same when the knives are out of action, and for dropping them when the knives are in action, means, essentially such as described, for moving the knives into action after the clamps have descended, means, essentially such as described, for drawing the knives against the card when moved into action, means, essentially such as described, for occasioning the retreat of the feeding device when the clamps have descended, means, essentially such as described, for occasioning the advance of the feeding device when the clamps have risen, means, essentially such as described, for throwing the knives out of action after the clamps have risen, and for returning the said knives into position to act upon another card, substantially as shown and described, and for the purposes set forth.

11. The combination of the cutter-shafts, the cutter-boxings provided with knives, means, essentially such as described, for occasioning the reciprocation of said cutter-boxings upon the shafts, and means, essentially such as described, for occasioning the oscillation of the shafts for the throwing of the knives into or out of action, substantially as described.

12. The combination of the cutter-shafts, the cutter-boxings provided with knives and mounted on said shafts, means, essentially such as described, for reciprocating the cutter-boxings upon the shafts, the lifting-rods, the lugs on the cutter-shafts, the fixed collars on the lifting-rods, and means, essentially such as described, for lifting and dropping the said lifting-rods so as to occasion the rotative movement of the shafts, substantially as described.

13. The combination of the cardways, the cutter-shafts, the cutter-boxings provided with the knives, means, essentially such as described, for occasioning the longitudinal travel of the cutter-boxings upon the shafts, and means, essentially such as described, for inclining the knives in and out with respect to the cardways, substantially as shown and described, and for the purposes specified.

14. The combination of the cardways, the movable side plates, and means, essentially such as described, for raising and lowering the said side plates with respect to the level of the cardways, substantially as shown and described, and for the purpose specified.

15. As a device for occasioning the reciprocation of the cutter-boxings, the driving-shaft, the crank-disk, the major rocker, the link, the minor rocker, the rock-shaft, the rocker-arms, and the extensible connecting-bars, substantially as shown and described.

16. As a means for occasioning the lift and drop of the lifting-rods, the rocking levers connected with said rods at their outer extremities and connected together at their inner extremities, the cam-disks provided with camway-grooves, and the rollers connected with the rocking levers and entered within said camway-grooves, substantially as shown and described, and for the purposes specified.

In testimony whereof I have hereunto signed my name this 10th day of March, A. D. 1885.

ALBERT H. POSTEL.

In presence of—
J. BONSALL TAYLOR,
WM. C. STRAWBRIDGE.